United States Patent [19]
Guidoux et al.

[11] 3,980,961
[45] Sept. 14, 1976

[54] FREQUENCY DEMODULATOR FOR A FSK DATA TRANSMISSION SYSTEM

[75] Inventors: Loïc Bernard Yves Guidoux, Saint-Michel-sur-Orge; Daniel José Francois Lommer, Velizy, both of France

[73] Assignee: Telecommunications Radioelectriques et Telephoniques T.R.T., Paris, France

[22] Filed: June 16, 1975

[21] Appl. No.: 587,268

[30] Foreign Application Priority Data
July 23, 1974 France .................. 74.25486

[52] U.S. Cl. .................. 329/104; 325/320; 328/168; 329/133
[51] Int. Cl.² .................. H03D 3/00
[58] Field of Search .......... 329/104, 107, 131, 133, 329/134; 328/168; 325/30, 320

[56] References Cited
UNITED STATES PATENTS
3,303,425   2/1967   Pendleton .................. 329/131
3,601,710   8/1971   Morra .................. 329/104

OTHER PUBLICATIONS

I.B.M. Tech Disc. Bull. "Digital Freq. Shift Key Demod." Dwire et al., vol. 17, No. 6, Nov. 1974.

Primary Examiner—John Kominski
Attorney, Agent, or Firm—Frank R. Trifari; Simon L. Cohen

[57] ABSTRACT

Frequency demodulator for a frequency-shift-keying data transmission system, which demodulator comprises, in cascade, a monostable circuit, a lowpass filter and a voltage comparator to which a threshold voltage is applied. The demodulator further comprises a switch which is operated by the monostable circuit and supplies to the lowpass filter either one or the other of two voltages derived from the same supply source and having different polarities. The threshold voltage is fixed at zero and in order to correct the bias distortion one of the said two voltages is adjusted.

4 Claims, 6 Drawing Figures

FREQUENCY DEMODULATOR FOR A FSK DATA TRANSMISSION SYSTEM

The invention relates to a frequency demodulator in a system for transmitting data signals by means of frequency-shift-keying, which demodulator comprises a cascade arrangement of a monostable circuit operated by edges of a rectangular signal corresponding to the signal to be demodulated, a lowpass filter and a decision circuit which compares the output signal of the lowpass filter with a threshold voltage and restores the data signal.

In such a demoldulator the frequency of the signal at the input of the monostable circuit assumes either the value $f_0$ or the value $f_1$ in accordance with the value of the binary data signal. The lowpass filter delivers a signal which is the mean value of the output pulse signal of the monostable circuit and which hence assumes a minimum or a maximum level in accordance with the frequency $f_0$ or $f_1$ at the input of the demodulator. This signal, which when passing between the minimum and maximum levels shows more or less rounded edges, is shaped in the decision circuit by comparison with a threshold voltage. The decision circuit restores the rectangular data signal in which the durations of the binary 1 elements and of the binary 0 elements must be equal, assuming, as will be done hereinafter, that the durations of the transmitted binary 0 and 1 elements are equal. If these durations at the output of the decision circuit are not equal, the restored data signal is subject to a distortion generally referred to as bias distortion. This bias distortion may be due in particular to distortions of the transmission medium.

To permit the data signal to be correctly utilized the bias distortion must be avoided and hence in known frequency demodulators the threshold voltage applied to the decision circuit is adjusted so as to render the durations of the binary 0 and 1 elements equal. However, the adjustment obtained in this manner is not very stable, because it depends on the one hand upon the supply voltage from which the threshold voltage is derived and on the other hand upon the output logic levels of the monostable circuit, which are not strictly defined and stable.

It is an object of the present invention to provide a frequency demodulator including a device for controlling the bias distortion which does not suffer from the said disadvantages.

According to the invention a frequency demodulator of the type set forth comprises a switching circuit which is operated by the signal supplied by the monostable circuit and according to the value of this signal applies to the lowpass filter either one or the other of two voltages derived from the same voltage supply source and having different polarities, whilst for controlling the bias distortion means are provided for adjusting at least one of the said two voltages, the threshold voltage being fixed at earth potential.

Embodiments of the invention will now be described, by way of example, with reference to the accompanying diagrammatic drawings, in which.

Figure 1:
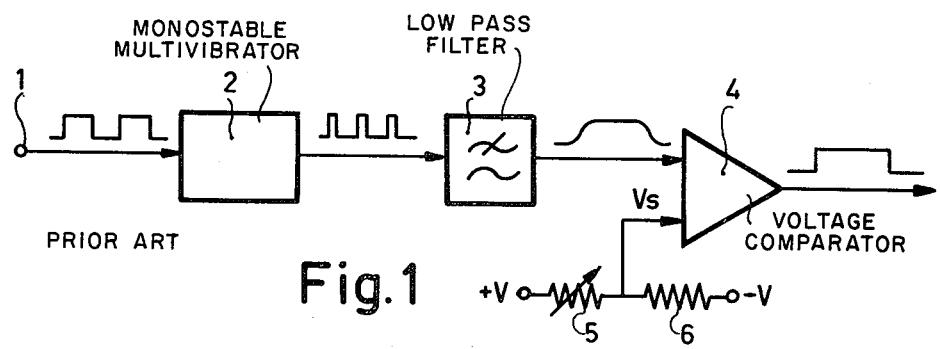
FIG. 1 is the circuit diagram of a known frequency demodulator.
Figure 3:
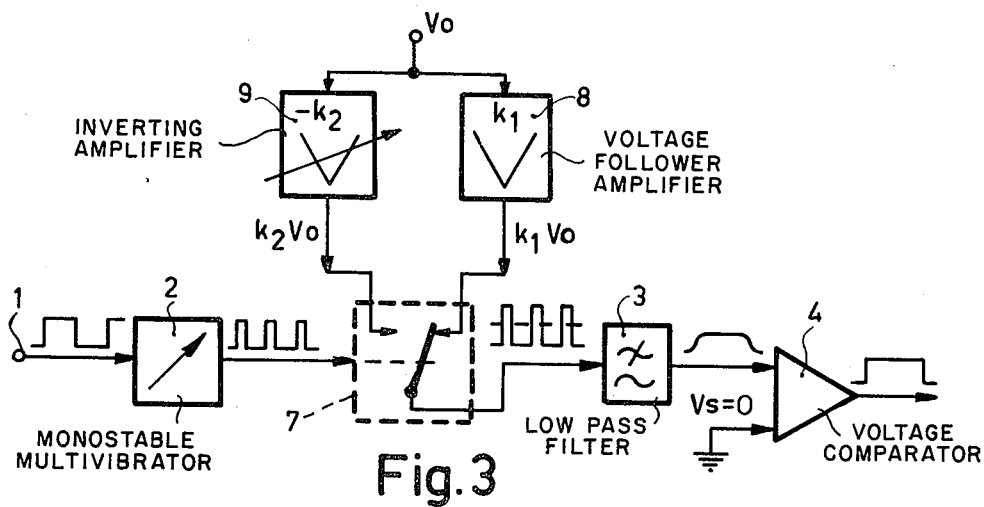
FIG. 3 shows the frequency demodulator according to the invention the operation of which is illustrated by the diagrams of FIG. 4.

The known demodulator shown in FIG. 1 and the demodulator according to the invention shown in FIG. 3 are required to restore the data in a data transmission system using frequency-shift-keying (FSK), the binary 0 and 1 elements of the data being transmitted by means of the frequencies $f_0$ and $f_1$.

Before the received FSK-signal is applied to an input 1 of the said demodulators it is shaped so as to be rectangular, and the rectangular signal of frequency $f_0$ or $f_1$ is applied to the input of a monostable circuit 2. This circuit delivers a pulse of duration $\tau$ at each edge of the rectangular signal applied to its input (or at the edges going in one direction) and the resulting pulse signal has either the level $B_0$ or the level $B_1$. In order to obtain a perfectly calibrated duration $\tau$ the monostable circuit may, for example, be implemented in a known digital way by using a counter which counts the clock pulses of highly stable frequency between two predetermined positions, said counting being triggered by each edge of the rectangular signal.

In the known modulator of FIG. 1 the output pulse signal of monostable circuit 2 is supplied to a lowpass filter 3 which produces the mean value of the pulse signal. The output signal of the lowpass filter shown in the diagram $a$ of FIG. 2 assumes the low level $A_0$ when the frequency at the input 1 of the demodulator has the value $f_0$, corresponding to the transmission of a binary 0 element, and assumes the high level $A_1$ when this frequency has the value $f_1$, corresponding to the transmission of a binary 1 element. For various reasons, in particular for limiting the bandwidth of the transmission channel, the output signal of lowpass filter 3 has more or less rounded edges when passing from the value $A_0$ to $A_1$ and vice versa. To obtain the data signal in a rectangular form the output signal of lowpass filter 3 is supplied to the input of a decision circuit which comprises a voltage comparator 4 to the other input of which is applied a threshold voltage $V_S$ which is derived from a direct-voltage supply source by means of a potentiometer comprising resistors 5 and 6 the ends of which are connected to the terminals $+V$ and $-V$ of the said source.

Figure 2A:
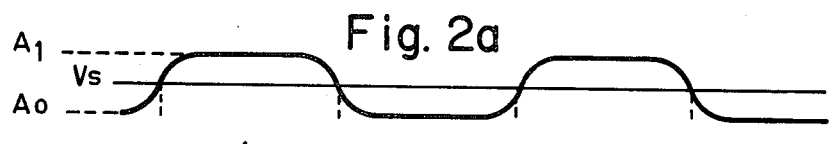
FIGS. 2a, 2b show diagrams illustrating the operation of the decision circuit.
Figure 2B:

At the output of voltage comparator 4 the restored data signal is obtained which is shown in diagram $b$ of FIG. 2 and has the required rectangular shape, the edges being situated at the instants at which the varying signal of diagram $a$ is equal to the threshold voltage $V_S$.

In the absence of distortion in the transmission channel the threshold voltage $V_S$ is fixed at the middle of the levels $A_0$ and $A_1$, and thus in the restored data signal of diagram $b$ the duration of the 0 elements is equal to the duration of the 1 elements.

If distortion occurs in the transmission channel, the signal of diagram $a$ is deformed so that, although the threshold voltage $V_S$ remains fixed at the middle of the levels $A_0$ and $A_1$, the durations of the 1 elements and of the 0 elements in the signal $b$ are different. This bias distortion due to the distortion in the transmission channel can be eliminated by placing the threshold voltage $V_S$ differently with respect to the levels $A_0$ and $A_1$, and this adjustment is effected in the demodulator of FIG. 1 by suitably adjusting the threshold voltage $V_S$ by means of a variable resistor 5 or 6.

However, the resulting adjustment is not very stable and the bias distortion may reappear for reasons inherent in the demodulator. In actual fact, on the one hand the supply voltages $+V$ and $-V$ upon which the threshold voltage $V_S$ depends may vary with time; on the other hand, the levels, $A_0$ and $A_1$ of the signal being compared with $V_S$ in voltage comparator 4 depend upon the levels $B_0$ and $B_1$ of the pulse signal supplied by monostable circuit 2. Now these levels $B_0$ and $B_1$ are output levels of logic circuits which, as is known, are not strictly defined and may vary with time.

The demodulator according to the invention shown in FIG. 3 provides a means of correcting the bias distortion whilst avoiding the said disadvantages. It includes elements which correspond to those of the demodulator of FIG. 1 and hence are designated by the same reference numerals.

The demodulator according to the invention shown in FIG. 3 comprises a 2-position switch 7 which is operated by the signal supplied by monostable circuit 2 and according to the value $B_0$ or $B_1$ of the output signal from monostable circuit 2 applies to lowpass filter 3 either one or the other of two voltages $k_1V_0$ and $-k_2V_0$ derived from the same voltage supply source $V_0$ and having different polarities. In the embodiment shown in FIG. 3 the two voltages $k_1V_0$ and $-k_2V0$ are obtained by means of a non-inverting amplifier 8 and an inverting amplifier 9 which amplify the same voltage $V_0$ with a positive gain $k_1$ and a negative gain $-k_2$. For correcting the bias distortion means are provided for adjusting, for example, the voltage $-k_2V_0$ (by controlling the gain $-k_2$ of inverting amplifier 9), while the threshold voltage $V_S$ applied to voltage comparator 4 is fixed at earth potential ($V_S = 0$). In FIG. 3 switching circuit 7 is shown as a 2-position switch, however, it may also be constituted by static means in the form of simple logic circuits.

Figure 4:
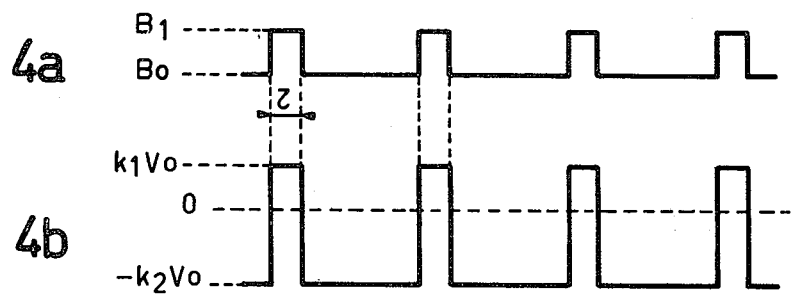

To explain the operation of the demodulator of the invention, diagram $a$ of FIG. 4 shows the pulse signal supplied by monostable circuit 2 which operates switching circuit 7. From the above it will readily be understood that the signal supplied by switching circuit 7 to lowpass filter 3 has the shape shown in diagram $b$ of FIG. 4. For the durations $\tau$ of th pulses supplied by monostable circuit 2 the level of the signal at the input of lowpass filter 3 is $k_1V_0$, and for the remaining time it is $-k_2V_0$. Hereinafter it will be assumed that monostable circuit 2 responds to each edge of the signals of frequency $f_0$ or $f_1$ applied to its input so that the frequency of the pulse signal at its output is $2f_0$ or $2f_1$, respectively.

Lowpass filter 3 supplies a signal which is the mean value of the signal of diagram $b$ in FIG. 4. This signal has the form already shown in diagram $a$ of FIG. 2 and has a low level when the frequency at the input of the demodulator is $f_0$, and a high level when this frequency is $f_1$. In voltage comparator 4 the signal of diagram $a$ in FIG. 2 is compared with a threshold voltage $V_S$ which in the demodulator according to the invention remains fixed at zero.

From the diagrams of FIG. 4 it can be simply calculated that with respect to the voltage $V_S = 0$ the low and high levels of the signal supplied by lowpass filter 3 have the following values $C_0$ and $C_1$ respectively:

$$\begin{cases} C_0 = -k_2V_0 + V_0\tau\ 2f_0(k_1+k_2) \\ C_1 = -k_2V_0 + V_0\tau\ 2f_1(k_1+k_2) \end{cases} \quad (1)$$

In the absence of distortion due to the transmission channel there will be no bias distortion in the signal supplied by voltage comparator 4 if threshold voltage $V_S = 0$ lies midway between the levels $C_0$ and $C_1$. In other words, these levels $C_0$ and $C_1$ must satisfy the relation:

$$C_0 + C_1/2 = 0 \quad (2)$$

Substituting the formulas (1) in the relation (2) it will readily be seen that the latter is equivalent to:

$$k_1\tau\ (f_0+f_1) + k_2[\tau\ (f_0+f_1) - 1] = 0 \quad (3)$$

Because the frequencies $f_0$ and $f_1$ at the input of the demodulator are fixed, the relation (3) can be satisfied by adjusting one of the parameters $k_1$, $k_2$ and $\tau$. It should be noted that the correction obtained is independent of the voltage $V_0$.

The means which can be implemented most readily is to maintain constant the duration $\tau$ of the pulses from the monostable circuit and the gain of one amplifier and to adjust the gain of the other amplifier. This is shown in the demodulator of FIG. 3, in which, for example, amplifier 8 is a voltage follower having a gain $k_1 = 1$ and amplifier 9 is an inverting amplifier of variable gain $-k_2$. In this case the value of the gain $-k_2$ is derived from the relation (3):

$$-k_2 = \frac{\tau(f_0+f_1)}{\tau(f_0+f_1)-1} \quad (4)$$

It will be seen that in the formula (4) the gain $-k_2$ always is negative. In fact the duration $\tau$ of the pulses from the monostable circuit is such that $\tau<1/2f_1$, where $f_1$ is the higher frequency, from which it follows that $\tau<1/f_0 +f_1$ and hence $-k_2<0$.

Another possible manner of satisfying the relation (3) is to maintain constant the gain $k_1$ and $-k_2$ of amplifiers 8 and 9 and to control the duration $\tau$ of the pulses from monostable circuit 2. For example, if $k_1 = k_2 = 1$, the following value of $\tau$ is derived from the relation (3):

$$\tau = \frac{1}{2(f_0+f_1)} \quad (5)$$

When distortion occurs in the transmission channel the signal at the output of lowpass filter 3 is deformed and, if the above adjustment is retained for which the threshold voltage $V_S = 0$ is midway between the low level $C_0$ and the high level $C_1$, the data signal at the output of voltage comparator 4 is subject to bias distortion. To eliminate this bias distortion the threshold voltage $V_S=0$ must have a value different from $C_1 + C_2/2$, which value can be written $C_0 + \alpha C_1/2$, where $\alpha$ is a parameter which in general is only slightly different from 1. Hence to eliminate the bias distortion in this case the following relation must apply:

$$C_0 + \alpha C_1/2 = 0 \quad (6)$$

Substituting the values of $C_0$ and $C_1$ of formula (1) it will readily be seen that the relation (6) is equivalent to:

$$k_1\tau\ (f_0 + \alpha f_1) + k_2[\tau(f_0+\alpha f_1) - 1 +\alpha/2] = 0 \quad (7)$$

The bias distortion is eliminated if the relation (7) is satisfied and in the same manner as hereinbefore this may be obtained either by adjusting the gain of one of the amplifiers 8 and 9 or by adjusting the duration of the pulses from monostable circuit 2.

The adjustment obtained in this manner is particularly stable. In fact, it is independent of the threshold voltage $V_S$ which remains fixed at zero and independent of the logic output levels of monostable circuit 2 which no longer appear in the output signal of lowpass filter 3. When the bias distortion has been eliminated, the adjustment is independent of the supply voltage $V_0$. The stability of adjustment depends only on the duration $\tau$ of the pulses from the monostable circuit and on the gain of the amplifiers. Now digital monostable circuits can be constructed in which the pulse duration has the stability of a clock frequency. Also circuit arrangements can be constructed in which operational amplifiers are used an in which highly stable gain factors are obtained which depend only on a resistance ratio.

Figure 5:
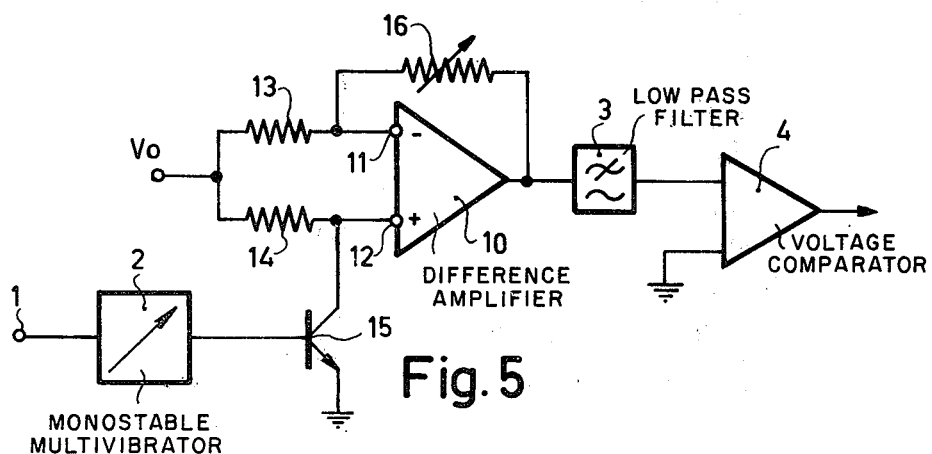
FIG. 5 shows another embodiment of the demodulator according to the invention.

The two amplifiers 8 and 9 may be combined and realized by means of known circuits using a single amplifier whose gain can be switched. A circuit of such type is shown by way of example in FIG. 5. In this Figure, the voltage $V_0$ is applied via resistors 13 and 14 of equal value R to an inverting (negative) input terminal 11 and a non-inverting (positive) input terminal 12 of an amplifier 10. The output of monostable circuit 2 is connected to the base of a transistor 15 whose collector-emitter path is connected between non-inverting (positive) input terminal 12 of amplifier 10 and earth. A resistor 16 of value $R_1$ is connected between the output and inverting (negative) input terminal 11 of amplifier 10. The output of amplifier 10 is also connected to lowpass filter 3.

The transistor 15 serves as the switching circuit operated by the pulse signal supplied by monostable circuit 2. When this pulse signal has the level $B_0$ close to zero, the amplifier arrangement has the gain $k_1 = 1$, and when the pulse signal has the positive level $B_1$ the amplifier arrangement has the gain $-R_1/R$ which can be varied by means of resistor $R_1$. The signal at the input of lowpass filter 3 has the form shown in diagram *b* of FIG. 4 with a constant high level equal to $V_0$ and a variable low level equal to $-R_1V_0/R$.

What is claimed is:

1. Frequency demodulator in a system for transmitting data signals by means of frequency-shift-keying, which demodulator comprises a cascade arrangement of a monostable circuit operated by edges of a rectangular signal corresponding to the signal to be demodulated, a lowpass filter and a decision circuit which compares the output signal of the lowpass filter with a threshold voltage and restores the data signal, wherein the demodulator comprises a switching circuit which is operated by the signal supplied by the monostable circuit and according to the value of this signal supplies to the lowpass filter one or the other of two voltages derived from the same voltage supply source and having different polarities, while for correcting the bias distortion means are provided for adjusting at least one of the said two voltages, the threshold voltage being fixed at earth potential.

2. Frequency demodulator as claimed in claim 1, wherein the said two voltages of different polarities are obtained by means of a non-inverting amplifier and an inverting amplifier which both amplify and same supply voltage, while for the purpose of correcting the bias distortion means are provided for adjusting the gain of one amplifier.

3. Frequency demodulator as claimed in claim 1, wherein for the purpose of correcting the bias distortion means are provided for adjusting the pulse duration of the monostable circuit.

4. Frequency demodulator as claimed in claim 2, wherein for the purpose of correcting the bias distortion means are provided for adjusting the pulse duration of the monostable circuit.

* * * * *

UNITED STATES PATENT AND TRADEMARK OFFICE
CERTIFICATE OF CORRECTION

PATENT NO. : 3,980,961

DATED : September 14, 1976

INVENTOR(S) : LOIC BERNARD YVES GUIDOUX ET AL

It is certified that error appears in the above-identified patent and that said Letters Patent are hereby corrected as shown below:

Col. 3, line 16, "disignated" should be --designated--;

line 43, "th" should be --the--;

Col. 4, line 5, equation (2) should read:

$$--(c_0 + c_1)/2 = 0--;$$

line 34, " $\tau < 1/f_0 + f_1$ " should read:

$$-- \tau < 1/(f_0 + f_1) --;$$

line 52, "$c_1 + c_2$" should be --$(c_1 + c_2)$--;

line 53, "$c_0 + \alpha c_1/2$" should read --$(c_0 + \alpha c_1)/2$--;

line 58, equation (6) should read:

$$--(c_0 + \alpha c_1)/2 = 0--;$$

line 64, equation (7) should read:

$$--k_1 \tau(f_0 + \alpha f_1) + k_2 [\tau(f_0 + \alpha f_1) - (1 + \alpha)/2] = 0--;$$

UNITED STATES PATENT AND TRADEMARK OFFICE
CERTIFICATE OF CORRECTION

PATENT NO. : 3,980,961

DATED : September 14, 1976

INVENTOR(S) : LOIC VERNARD YVES GUIDOUX ET AL

It is certified that error appears in the above-identified patent and that said Letters Patent are hereby corrected as shown below:

Col. 5, line 16, "an" should be --and--;

Claim 2, line 4, "and" should be --the--;

Signed and Sealed this

Twenty-third Day of November 1976

[SEAL]

Attest:

RUTH C. MASON
Attesting Officer

C. MARSHALL DANN
Commissioner of Patents and Trademarks